(12) United States Patent
Kim (10) Patent No.: US 9,275,609 B2
(45) Date of Patent: Mar. 1, 2016

(54) DISPLAY DEVICE WITH PROGRAMMABLE GAMMA UNIT

(71) Applicant: LG Display Co., Ltd., Seoul (KR)

(72) Inventor: Daehwan Kim, Daegu (KR)

(73) Assignee: LG Display Co., Ltd., Seoul (KR)

( * ) Notice: Subject to any disclaimer, the term of this patent is extended or adjusted under 35 U.S.C. 154(b) by 314 days.

(21) Appl. No.: 13/730,015

(22) Filed: Dec. 28, 2012

(65) Prior Publication Data
US 2013/0300773 A1 Nov. 14, 2013

(30) Foreign Application Priority Data

May 14, 2012 (KR) .................. 10-2012-0050999

(51) Int. Cl.
*G09G 5/10* (2006.01)
*G09G 3/36* (2006.01)
*H04N 5/202* (2006.01)

(52) U.S. Cl.
CPC ................ *G09G 5/10* (2013.01); *G09G 3/3677* (2013.01); *H04N 5/202* (2013.01); *G09G 2320/0276* (2013.01); *G09G 2320/0673* (2013.01)

(58) Field of Classification Search
CPC .................................. G09G 3/36; G09G 5/10
USPC ....................................................... 345/690
See application file for complete search history.

(56) References Cited

U.S. PATENT DOCUMENTS

| 6,154,121 | A | * | 11/2000 | Cairns et al. | 341/138 |
| 2002/0063666 | A1 | * | 5/2002 | Kang et al. | 345/87 |
| 2005/0057482 | A1 | * | 3/2005 | Youngblood et al. | 345/100 |
| 2006/0125761 | A1 | * | 6/2006 | Ahn | 345/98 |
| 2009/0213055 | A1 | * | 8/2009 | Chung et al. | 345/89 |

FOREIGN PATENT DOCUMENTS

| CN | 1837904 A | 9/2006 |
| CN | 101140746 A | 3/2008 |
| CN | 101359911 A | 2/2009 |
| TW | 200926136 A | 6/2009 |

OTHER PUBLICATIONS

State Intellectual Property Office of the People's Republic of China, First Office Action, Chinese Patent Application No. 201210572405. 3, Dec. 23, 2014, eleven pages.
Taiwan Office Action, Taiwan Application No. 101149209, May 25, 2015, 16 pages.
Chinese Second Office Action, Chinese Application No. 201210572405.3, Jul. 17, 2015, 12 pages.

* cited by examiner

*Primary Examiner* — Jonathan Blancha
(74) *Attorney, Agent, or Firm* — Fenwick & West LLP (57) ABSTRACT

The present invention has been made in an effort to provide a display device comprising: a data driver; a display panel for displaying an image in response to a data signal supplied from the data driver; and a programmable gamma unit for supplying a gamma reference voltage to the data driver, wherein a different number of bits is allocated to each of decoders included in the programmable gamma unit.

15 Claims, 10 Drawing Sheets

| Type1 GMA1 Value | Type1 GMA2 Value | Type1 GMA3 Value | | Type1 GMA4 Value | | Type1 GMA5 Value |
|---|---|---|---|---|---|---|
| 7.6000 | 7.5696 | 6.2510 | 5.7550 | 5.2820 | 4.7860 | 4.5980 |
| 7.5557 | 7.4810 | 6.1890 | 5.6930 | 5.2200 | 4.7240 | 4.4840 |
| 7.5114 | 7.3924 | 6.1270 | 5.6310 | 5.1580 | 4.6620 | 4.3700 |
| 7.4670 | 7.3036 | 6.0650 | 5.5690 | 5.0960 | 4.6000 | 4.2560 |
| 0.044V per step | 0.088V per step | 6.0030 | 5.5070 | 5.0340 | 4.5380 | 4.1420 |
| | | 5.9410 | 5.4450 | 4.9720 | 4.4760 | 4.0280 |
| | | 5.8790 | 5.3830 | 4.9100 | 4.4140 | 3.9140 |
| | | 5.8170 | 5.3200 | 4.8480 | 4.3510 | 3.8000 |
| | | 0.062V per step | | 0.062V per step | | 0.11V per step |

Fig. 14

| Type2 GMA1 Value | Type2 GMA2 Value | Type2 GMA3 Value | | Type2 GMA4 Value | | Type2 GMA5 Value |
|---|---|---|---|---|---|---|
| 7.6000 | 7.4950 | 6.0103 | 5.5303 | 5.0660 | 4.5540 | 4.3360 |
| 7.5040 | 7.4044 | 5.9503 | 5.4703 | 5.0020 | 4.4900 | 4.2595 |
| 7.4080 | 7.3138 | 5.8903 | 5.4103 | 4.9380 | 4.4260 | 4.1830 |
| 7.3120 | 7.2230 | 5.8303 | 5.3503 | 4.8740 | 4.3620 | 4.1065 |
| 0.096V per step | 0.090V per step | 5.7703 | 5.2903 | 4.8100 | 4.2980 | 4.0300 |
| | | 5.7103 | 5.2303 | 4.7460 | 4.2340 | 3.9535 |
| | | 5.6503 | 5.1703 | 4.6820 | 4.1700 | 3.8770 |
| | | 5.5903 | 5.1090 | 4.6180 | 4.1070 | 3.8000 |
| | | 0.060V per step | | 0.064V per step | | 0.076V per step |

DISPLAY DEVICE WITH PROGRAMMABLE GAMMA UNIT

CROSS-REFERENCE TO RELATED APPLICATION

This application claims the benefit of Korean Patent Application NO. 10-2012-0050999 filed on May 14, 2012, which is incorporated herein by reference for all purposes as if fully set forth herein.

BACKGROUND

1. Field of the Disclosure

This document relates to a display device.

2. Related Art

With the development of information technology, the market for display devices (i.e., media connecting users and information) is growing. In line with this trend, the use of flat panel displays (FPDs), such as a liquid crystal display (LCD) device, an organic light emitting diode (OLED) display device, and a plasma display panel (PDP), is increasing. Of the aforementioned display devices, the liquid crystal displays are in widespread use since they can implement high resolution and be configured to have a large size as well as a small size.

Such a display device uses a programmable gamma unit that generates a gamma reference voltage by a programming method in order to represent desired luminance and color coordinates on a display panel. The programmable gamma unit comprises decoders for generating a gamma reference voltage, and the gamma reference voltage is supplied to a data driver for supplying a data signal to the display panel.

On a gamma curve, gamma changes a lot toward the center even with a slight change in voltage level. However, it is difficult to finely regulate the voltage level of a gamma reference voltage for a gray scale positioned at the center of the gamma curve because the same number of bits (e.g., 3 bits) is allocated to the decoders of the conventional programmable gamma unit. That is, it is difficult to finely regulate the voltage level of the gamma reference voltage because the number of bits allocated to the corresponding area is small.

Although there may be no problem with the same number of bits allocated to all the decoders as long as the number of bits is increased, an increase in the number of bits leads to an increase in the use of registers and a cost rise. Therefore, there is a demand for solving these problems.

SUMMARY

The present invention has been made in an effort to provide a display device comprising: a data driver; a display panel for displaying an image in response to a data signal supplied from the data driver; and a programmable gamma unit for supplying a gamma reference voltage to the data driver, wherein a different number of bits is allocated to each of decoders included in the programmable gamma unit.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Reference will now be made in detail embodiments of the invention examples of which are illustrated in the accompanying drawings.

Hereinafter, a concrete embodiment of the present invention will be described with reference to the accompanying drawings.

Figure 1:
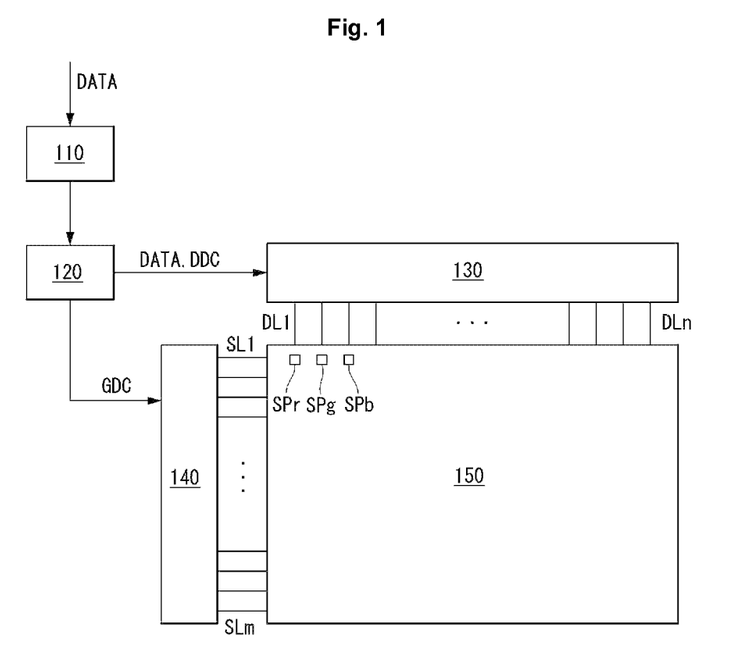
FIG. 1 is a schematic block diagram of a display device according to an exemplary embodiment of the present invention.

As shown in FIG. 1, a display device according to an exemplary embodiment of the present invention comprises an image processor 110, a timing controller 120, a data driver 130, a scan driver 140, and a display panel 150.

The display panel 150 comprises sub-pixels SPr, SPg, and SPb disposed in a matrix form. The sub-pixels SPr, SPg, and SPb comprise a red sub-pixel SPr, a green sub-pixel SPg, and a blue sub-pixel SPb, which form a pixel. The pixel may further comprise a white sub-pixel.

The display panel 150 may be a liquid crystal display panel, an organic electroluminescence display panel, or a plasma display panel. In the present invention, for the convenience of explanation, the circuit configuration of the sub-pixels will be described by taking the organic electroluminescence display panel and the liquid crystal display panel as an example of the display panel 150.

Figure 2:
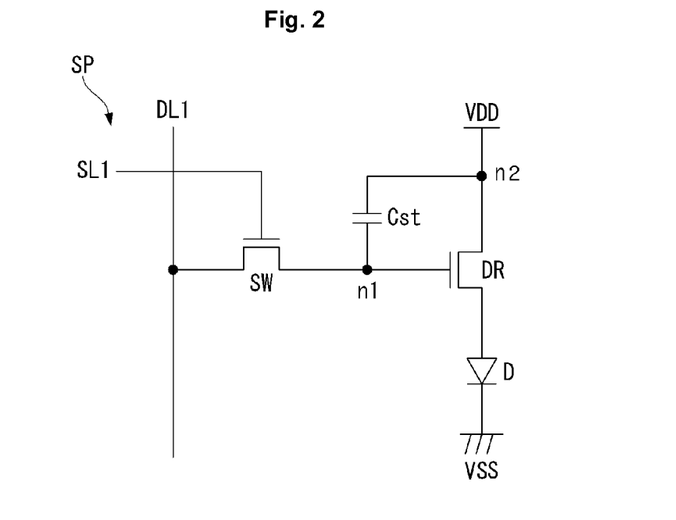
FIGS. 2 and 3 are illustrations of the circuit configuration of a sub-pixel.

Firstly, if the display panel 150 is an organic electroluminescence display panel, the sub-pixels SPr, SPg, and SPb may have the circuit configuration shown in FIG. 2.

A gate of a switching transistor SW is connected to a scan line SL1 through which a gate signal is supplied, one end thereof is connected to a data line DL1 through which a data signal is supplied, and the other end thereof is connected to a first node n1. A gate of a driving transistor DR is connected to the first node n1, one end thereof is connected to a second node n2 connected to a first power line VDD to which a high-potential voltage is supplied, and the other end thereof is connected to a third node n3 (not shown). One end of a storage capacitor Cst is connected to the first node n1, and the other end thereof is connected to the second node n2. An anode of an organic light emitting diode D is connected to the third node n3 (not shown) connected to the other end of the driving transistor T2, and a cathode thereof is connected to a second power line VSS to which a low-potential voltage is supplied.

The organic electroluminescence display panel having the above-mentioned circuit configuration can display an image as an emission layer included in each sub-pixel emits light in accordance with a gate signal supplied through the scan line SL1 and a data signal supplied through the data line DL1.

The sub-pixels may have a 2T (Transistor) 1C (Capacitor) structure comprising a switching transistor SW, a driving transistor DR, a capacitor Cst, an organic light emitting diode D, or may have a 3T1C structure, a 4T1C structure, a 5T2C structure, and the like, comprising more transistors and capacitors. The subpixels are formed as top-emission type subpixels, bottom-emission type subpixels, or dual-emission type subpixels depending on their structure.

Figure 3:
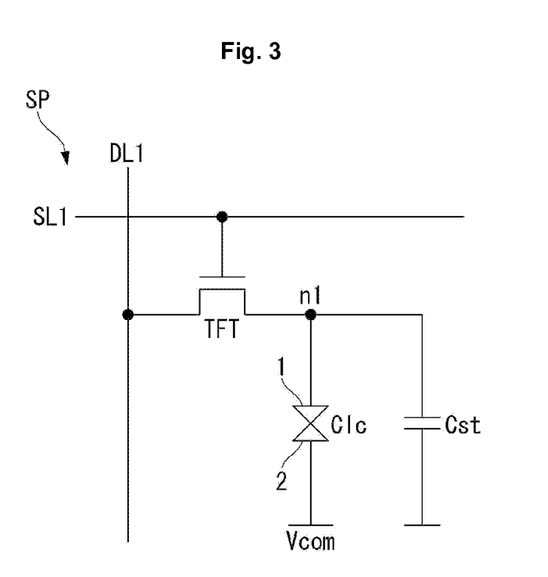

Unlike the above, in a case where the display panel 150 is configured as a liquid crystal display panel, the sub-pixel may have the following circuit configuration as shown in FIG. 3.

A gate of a switching transistor TFT is connected to a scan line SL1 through which a gate signal is supplied, one end thereof is connected to a data line DL1 through which a data signal is supplied, and the other end thereof is connected to a first node n1. One end of a pixel electrode 1 located at one side of a liquid crystal cell Clc is connected to the first node n1 connected to the other end of the switching transistor TFT, and a common electrode 2 located the other side of the liquid crystal cell Clc is connected to a common voltage line Vcom.

The liquid crystal display panel having such a circuit configuration can display an image by the transmission of light according to a change in a liquid crystal layer included in each sub-pixel in accordance with a gate signal supplied through the scan line SL1 and a data signal DATA supplied through the data line DL1.

The sub-pixels are configured to operate in an IPS (In Plane Switching) mode or FFS (Fringe Field Switching) mode were a pixel electrode and a common electrode are formed on a thin film transistor substrate, or to operate in a TN (Twisted Nematic) mode or VA (Vertical Alignment) mode by varying the structures and positions of the pixel electrode and the common electrode.

Referring again to FIG. 1, the image processor 110 receives a vertical synchronization signal, a horizontal synchronization signal, a data enable signal, a clock signal, and a data signal DATA from an external source. The image processor 110 performs image processing on the data signal DATA, and supplies it to the timing controller 120. The image processor 110 calculates an average picture level by using the data signal DATA, and performs peak luminance control based on the average picture level. The image processor 110 may perform other various image processing operations by using the data signal DATA.

The timing controller 120 receives a vertical synchronization signal, a horizontal synchronization signal, a data enable signal, a clock signal, and a data signal DATA from the image processor 110. The timing controller 120 controls operation timings of the data driver 130 and the scan driver 140 using timing signals such as the vertical synchronization signal, the horizontal synchronization signal, the data enable signal, and the clock signal. Since the timing controller 120 can determine a frame period by counting data enable signals of 1 horizontal period, the vertical synchronization signal and the horizontal synchronization signal, which are supplied from an external source, can be omitted. Control signals generated from the timing controller 120 comprise a gate timing control signal GDC for controlling the operation timing of the scan driver 140 and a data timing control signal DDC for controlling the operation timing of the data driver 130. The gate timing control signal DDC comprise a gate start pulse, a gate shift clock signal, a gate output enable signal, etc. The data timing control signal DDC comprises a source start pulse, a source sampling clock, a polarity control signal, a source output enable signal, etc.

The scan driver 140 sequentially generates scan signals in response to the gate timing control signal GDC supplied from the timing controller 120. The scan driver 140 supplies scan signals generated through scan lines SL1 to SLm to the sub-pixels SPr, SPg, and SPb included in the display panel 150. The scan driver 140 is formed in the form of an integrated circuit and mounted on an external substrate, or formed in the form of GIP (Gate In Panel) on the display panel 150, along with a thin film transistor process. The scan driver 140 formed in the form of an integrated circuit is as shown in FIG. 4.

Figure 4:
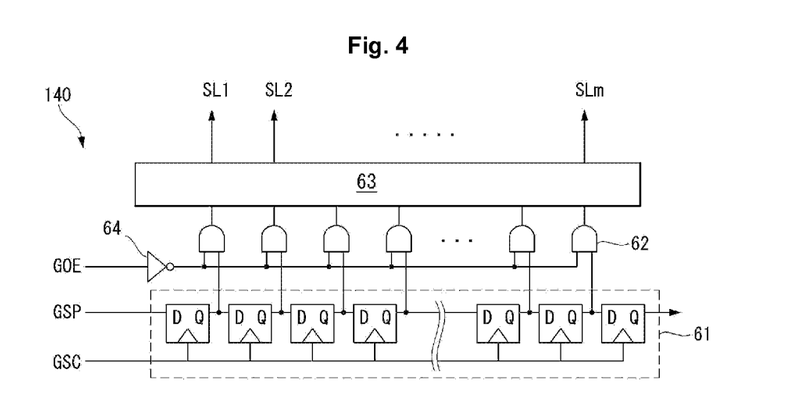
FIG. 4 is a block diagram of a scan driver and FIG. 5 is a block diagram of a data driver.

Referring to FIG. 4, the scan driver 140 comprises a shift register 61, a level shifter 63, a plurality of AND gates connected between the shift register 61 and the level shifter 63, an inverter 64 for inverting the gate output enable signal GOE, and the like. The shift register 61 sequentially shifts gate start pulses GSP according to the gate shift clock GSC by using a plurality of dependently connected D-flip-flops. The AND gates 62 performs AND operation on an output signal of the shift register 61 and an inversion signal of the gate output enable signal GOE to generate an output. The inverter 64 inverts the gate output enable signal GOE to supply the inverted gate output signal GOE to the AND gates 62. The level shifter 63 shifts an output voltage swing width of the AND gates 62 to a scan voltage swing width with which the transistors included in the display panel 150 can operate. A scan signal outputted from the level shifter 63 is sequentially supplied to the scan lines SL1 to SLm.

Referring back to FIG. 1, the data driver 130 samples and latches the data signal DATA supplied form the timing controller 120 in response to the data timing control signal DDC supplied from the timing controller 120 and converts it into a data signal in parallel data format. The data driver 130 converts a digital data signal into an analog data signal in parallel data format in response to gamma reference signals GMA1 to GMAn. The conversion of a digital data signal into an analog data signal is carried out by a digital-to-analog converter DAC included in the data driver 130. The data driver 130 supplies the data signal DATA converted through the data lines DL1 to DLn to the sub-pixels SPr, SPg, and SPb included in the display panel 150. The data driver 130 is formed in the form of an integrated circuit and mounted on an external substrate. The data driver 130 formed in the form of an integrated circuit is as shown in FIG. 5.

Figure 5:
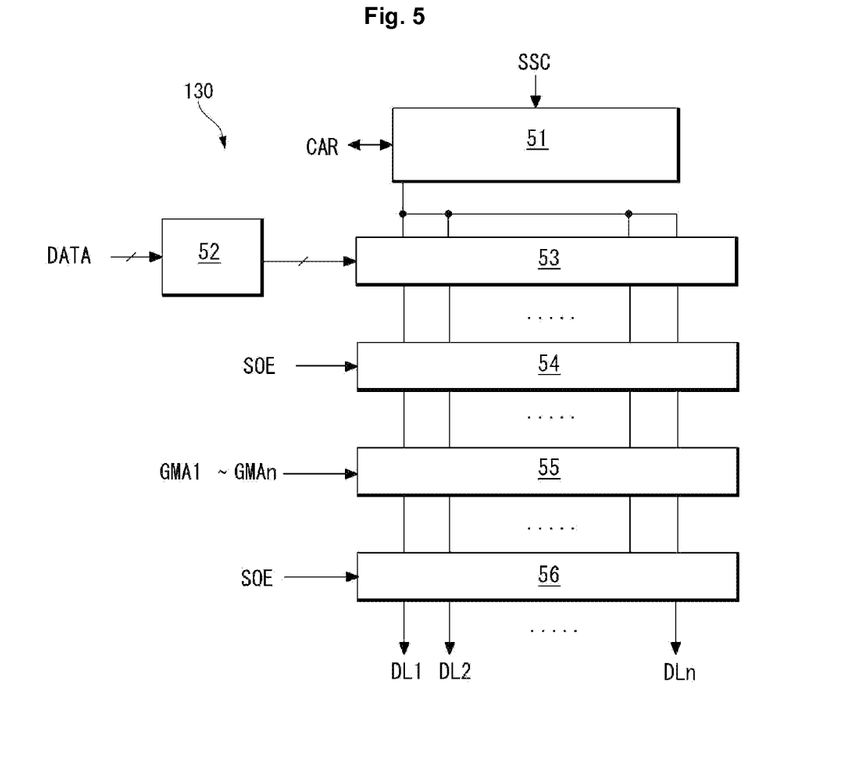

Referring to FIG. 5, the data driver 130 comprises a shift register 51, a data register 52, a first latch 53, a second latch 54, a DA converter 55, and an output circuit 56. The shift register 51 shifts the source sampling clock SSC supplied from the timing controller 120. The shift register 51 delivers a carry signal CAR to a shift register of a source drive IC of a neighboring next stage. The data register 52 temporarily stores data signal DATA supplied from the timing controller 120 and supplies them to the first latch 53. The first latch 53 samples and latches the data signals DATA input in series according to clocks sequentially supplied from the shift register 51, and simultaneously outputs them. The second latch 54 latches the data signals supplied from the first latch 53, and simultaneously outputs them in synchronization with the second latches 54 of other source drives ICs in response to the source output enable signal SOE. The DA converter 55 converts the data signals DATA input from the second latch 54 into analog voltages in response to gamma reference voltages GMA1 to GMAn. The data signals DATA output from the output circuit 56 are supplied to the data lines DL1 to DLn in response to the source output enable signal SOE.

Hereinafter, a display device according to an exemplary embodiment of the present invention will be described in more detail.

First Exemplary Embodiment

Figure 6:
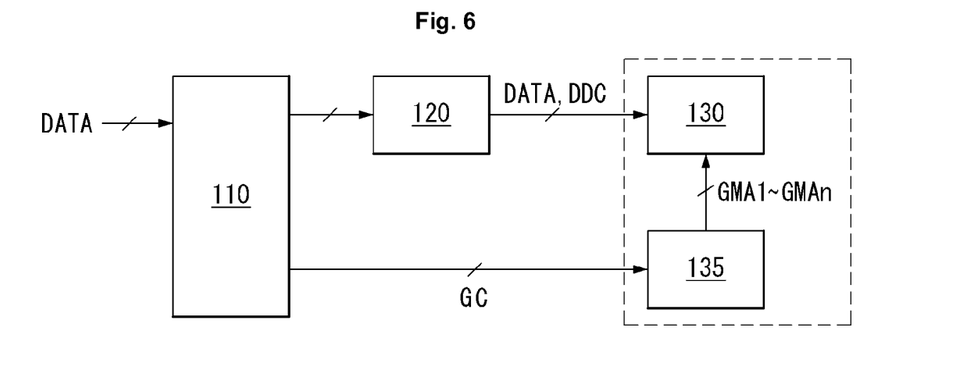
FIG. 6 is a view showing the configuration of part of a display device.
Figure 7:
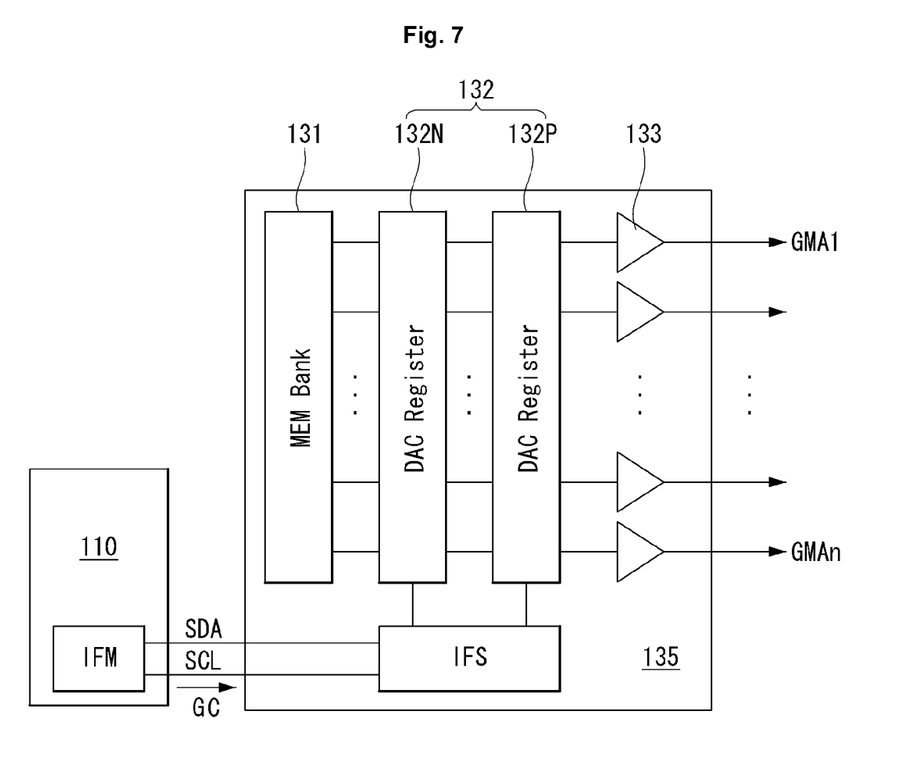
FIG. 7 is a block diagram of a programmable gamma unit shown in FIG. 6.

As shown in FIGS. 6 and 7, the display device comprises an image processor 110, a timing controller 120, a data driver 130, and a programmable gamma unit 135.

The data driver 130 converts a digital data signal into an analog data signal in parallel data format in response to gamma reference voltages GMA1 to GMAn supplied form the programmable gamma unit 135. As shown therein, the programmable gamma unit 135 may be configured separately outside the data driver 130, or included in the data driver 130.

The programmable gamma unit 135 supplies internal gamma reference voltages GMA1 to GMAn to the data driver 130 based on a gamma control signal GC supplied from the image processor 110.

Although the gamma control signal GC is supplied from the image processor 110, for example, in the exemplary embodiment of the present invention, the image processor 110 may comprise the timing controller 120 and one integrated circuit. Also, the gamma control signal GC may be supplied from the timing controller 120.

To this end, the image processor 110 and the programmable gamma unit 135 may perform communication by communication parts IFM and IFS respectively included therein, or may use other methods. In the case that the programmable gamma unit 135 sends and receives a control signal by a communication method, the communication parts IFM and IFS may have an I2C (Inter-Integrated Circuit) interface using a serial computer bus protocol.

In the case that the communication parts IFM and IFS of the image processor 110 and the programmable gamma unit 135 have an I2C interface, the first communication part IFM of the image processor 110 serves as a master, and the second communication part IFS of the programmable gamma unit 135 serves as a slave. Also, the image processor 110 and the programmable gamma unit 135 perform communication through the first and second communication parts IFM and IFS connected to communication lines SDA and SCL. With this configuration, the programmable gamma unit 135 outputs internal gamma reference voltages GMA1 to GMAn under the control of the image processor 110.

The programmable gamma unit 135 comprises a memory 131 storing internal gamma reference voltages, etc, decoders 132 for outputting the gamma reference voltages stored in the memory 131 as gamma reference voltages GMA1 to GMAn in response to a gamma control signal GC supplied from the image processor 110, and output circuits 133 for outputting the gamma reference voltages GMA1 to GMAn.

The gamma control signal GC may be a value for changing the gamma reference voltages stored in the memory 131, or a bit control signal for controlling the decoders 132. The memory 131 may store a preset gamma reference voltage or a gamma reference voltage supplied from the image processor 110.

The memory 131 may store bit control signal information for defining the number of input and output bits of the decoders 132.

The decoders 132 comprise DAC registers for converting a digital signal into an analog signal. The output circuits 133 comprise buffers or the like. The decoders 132 convert a gamma reference voltage in digital signal form stored in the memory 131 into a gamma reference voltage in analog signal form. The decoders 132 performing this function comprise first decoders 132P for outputting a positive gamma reference voltage and decoders 132N for outputting a negative gamma reference voltage.

The first decoders 132P and the second decoder 132N have the same configuration except that they output the gamma reference voltages GMA1 to GMAn as inverted voltages. Accordingly, in the description of the exemplary embodiment below, the first decoders 132P and the second decoders 132N are commonly referred to as the decoders 132.

Figure 8:
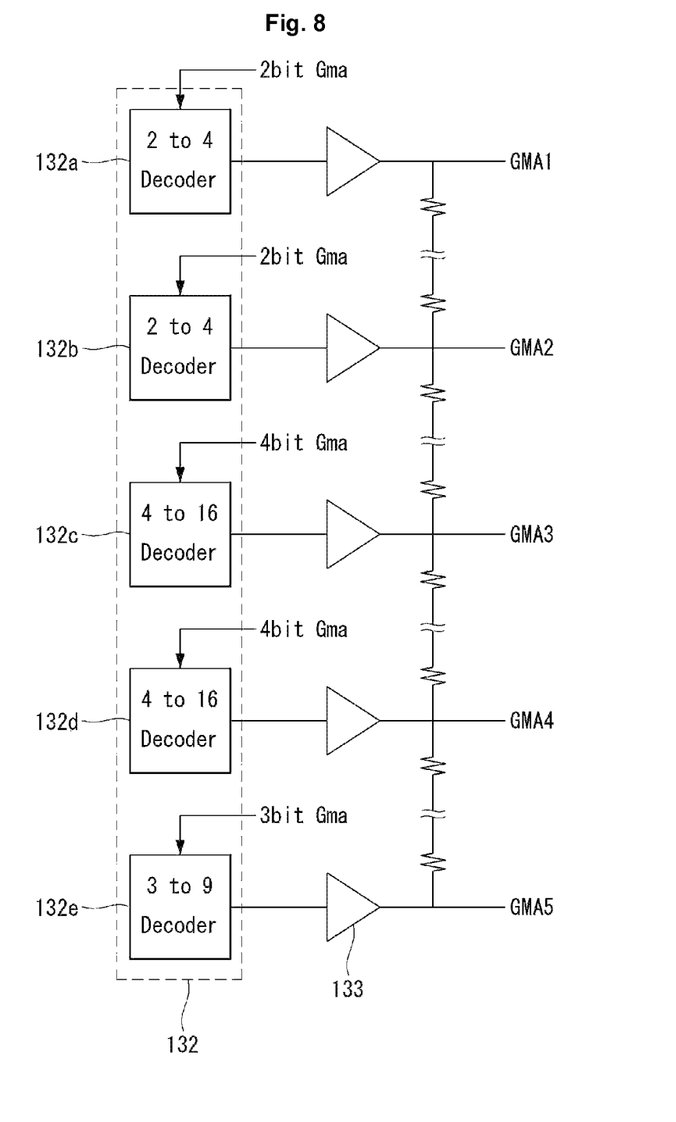
FIG. 8 is a block diagram of decoders according to a first exemplary embodiment of the present invention.

A different number of bits is allocated to each of the decoders 132 according to the first exemplary embodiment of the present invention. More specifically, the number of bits allocated to each of the decoders 132 differs according to gray scale.

On a gamma curve, gamma changes a lot toward the center even with a slight change in voltage level. The number of bits allocated to each of the decoders 132 may be greater at an intermediate gray scale than at a low gray scale and greater at the intermediate gray scale than at a high gray scale.

As shown in FIG. 8, the decoders 132 according to the first exemplary embodiment of the present invention may comprise low gray scale decoders 132a and 132b to which i bits (i is an integer equal to or greater than 2) are allocated, intermediate gray scale decoders 132c and 132d to which j bits (j is an integer equal to or greater than 4) are allocated, and a high gray scale decoder 132e to which k bits (k is an integer equal to or greater than 3) are allocated.

For example, 2 bits are allocated to the low gray scale decoders 132a and 132b, 3 bits are allocated to the intermediate gray scale decoders 132c and 132d, and 3 bits are allocated to the high gray scale decoder 132e. Accordingly, the low gray scale decoders 132a and 132b may consist of 2 to 4 decoders, the intermediate gray scale decoders 132c and 132d may consist of 4 to 16 decoders, and the high gray scale decoder 132e may consist of a 3 to 9 decoder.

Figure 9:
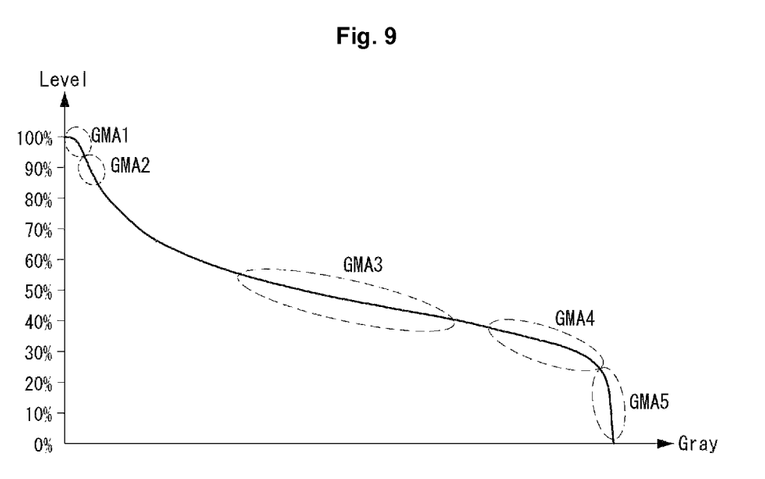
FIG. 9 shows a gamma curve diagram for explaining the advantages of the programmable gamma unit according to the first exemplary embodiment of the present invention.

Once bits are allocated to the decoders 132 as shown in FIG. 8, the voltage level for gray scales in intermediate gray scale areas GMA3 and GMA4 located at the center of a gamma curve can be further divided as shown in FIG. 9. That is, since the number of bits allocated to the central areas GMA3 and GMA4 of the gamma curve is greater than that allocated to the other areas GMA1, GMA2, and GM5, the voltage level of gamma reference voltages GMA1 to GM5 can be finely regulated.

The number of bits of the decoders 132 may be varied in response to bit control signals 2 bit Gma, 4 bit Gma, and 3 bit Gma supplied from an external source, for example the image processor 110. Accordingly, the number of bits of the decoders 132 may be fixed to a value determined when the programmable gamma unit is initially set, or regulated in accordance with the gray scale characteristics of the display panel.

Hereinafter, a second exemplary embodiment will be described with reference to FIGS. 10 to 14.

Second Exemplary Embodiment

Figure 10:
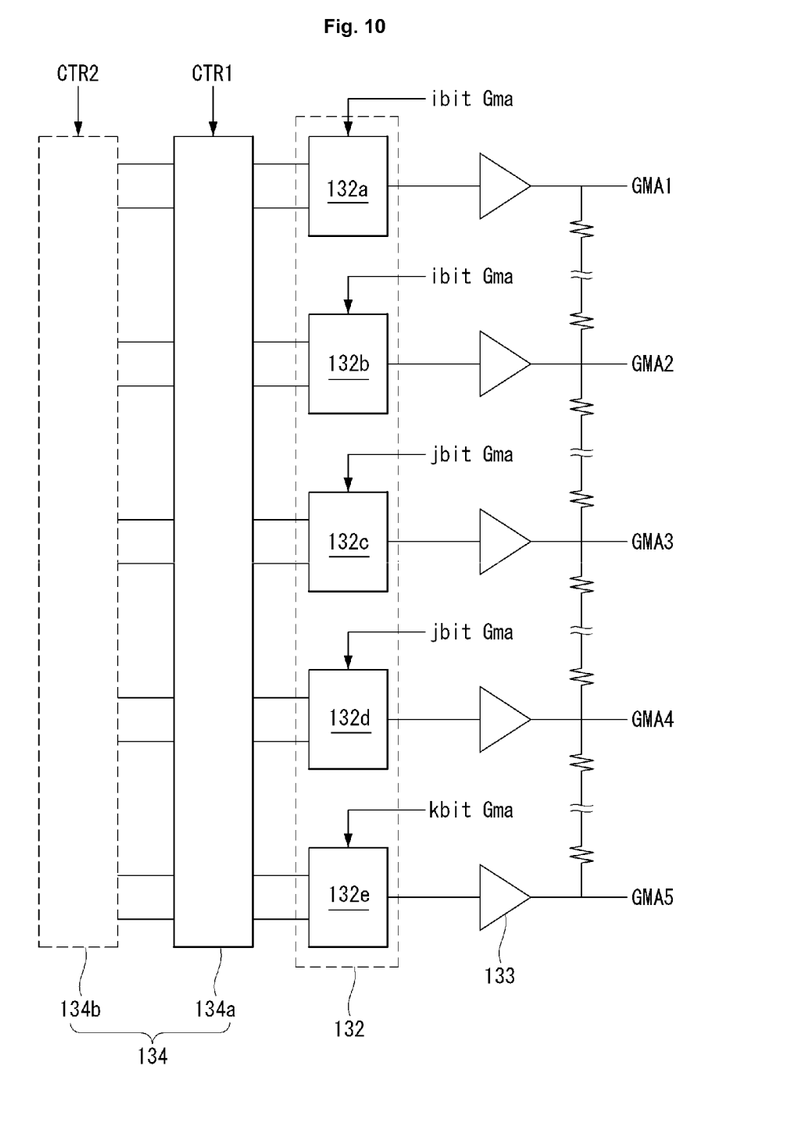
FIG. 10 is a block diagram of decoders according to a second exemplary embodiment of the present invention.

As shown in FIG. 10, a different number of bits is likewise allocated to each of the decoders 132 according to the second exemplary embodiment of the present invention. More specifically, the number of bits allocated to each of the decoders 132 differs according to gray scale.

The decoders 132 according to the second exemplary embodiment of the present invention may comprise low gray scale decoders 132a and 132b to which i bits (i is an integer equal to or greater than 2) are allocated, intermediate gray scale decoders 132c and 132d to which j bits (j is an integer equal to or greater than 4) are allocated, and a high gray scale decoder 132e to which k bits (k is an integer equal to or greater than 3) are allocated.

For example, 2 bits are allocated to the low gray scale decoders 132a and 132b, 3 bits are allocated to the intermediate gray scale decoders 132c and 132d, and 3 bits are allocated to the high gray scale decoder 132e. Accordingly, the low gray scale decoders 132a and 132b may consist of 2 to 4 decoders, the intermediate gray scale decoders 132c and 132d may consist of 4 to 16 decoders, and the high gray scale decoder 132e may consist of a 3 to 9 decoder.

Once bits are allocated to the decoders 132 as shown in FIG. 10, the voltage level for gray scales in intermediate gray scale areas GMA3 and GMA4 located at the center of a gamma curve can be further divided as shown in FIG. 9. That is, since the number of bits allocated to the central areas GMA3 and GMA4 of the gamma curve is greater than that allocated to the other areas GMA1, GMA2, and GM5, the voltage level of gamma reference voltages GMA1 to GM5 can be finely regulated.

The number of bits of the decoders 132 may be varied in response to bit control signals ibit Gma, jbit Gma, and kbit Gma supplied from an external source, for example the image processor 110. Accordingly, the number of bits of the decoders 132 may be fixed to a value determined when the programmable gamma unit is initially set, or regulated in accordance with the gray scale characteristics of the display panel.

A programmable gamma unit according to the second exemplary embodiment comprises a step voltage regulator 134 for regulating the step voltage level of the gamma reference voltages GMA1 to GMA5 which are pre-stored in the memory 131 or output from the decoders 132 in response to step regulation signals CTR1 and CTR2 supplied from an external source.

The step voltage regulator 134 may comprise N (N is an integer equal to or greater than 1) step voltage regulators so as to regulate the step voltage level of the gamma reference voltages GMA1 to GMA5 in accordance with the characteristics of the display panel. Although the second exemplary embodiment has been described with respect to an example in which the step voltage regulator 134 comprises two step voltage regulators 134a and 134b, the number of step voltage regulators may be increased depending on the characteristics of the display panel.

Regarding the step voltage regulator 134, one 134a or 134b of the two step voltage regulators 134a and 134b is selected in response to a step control signal CTR1 or CTR2 to supply a voltage to the decoders 132.

Figure 11:
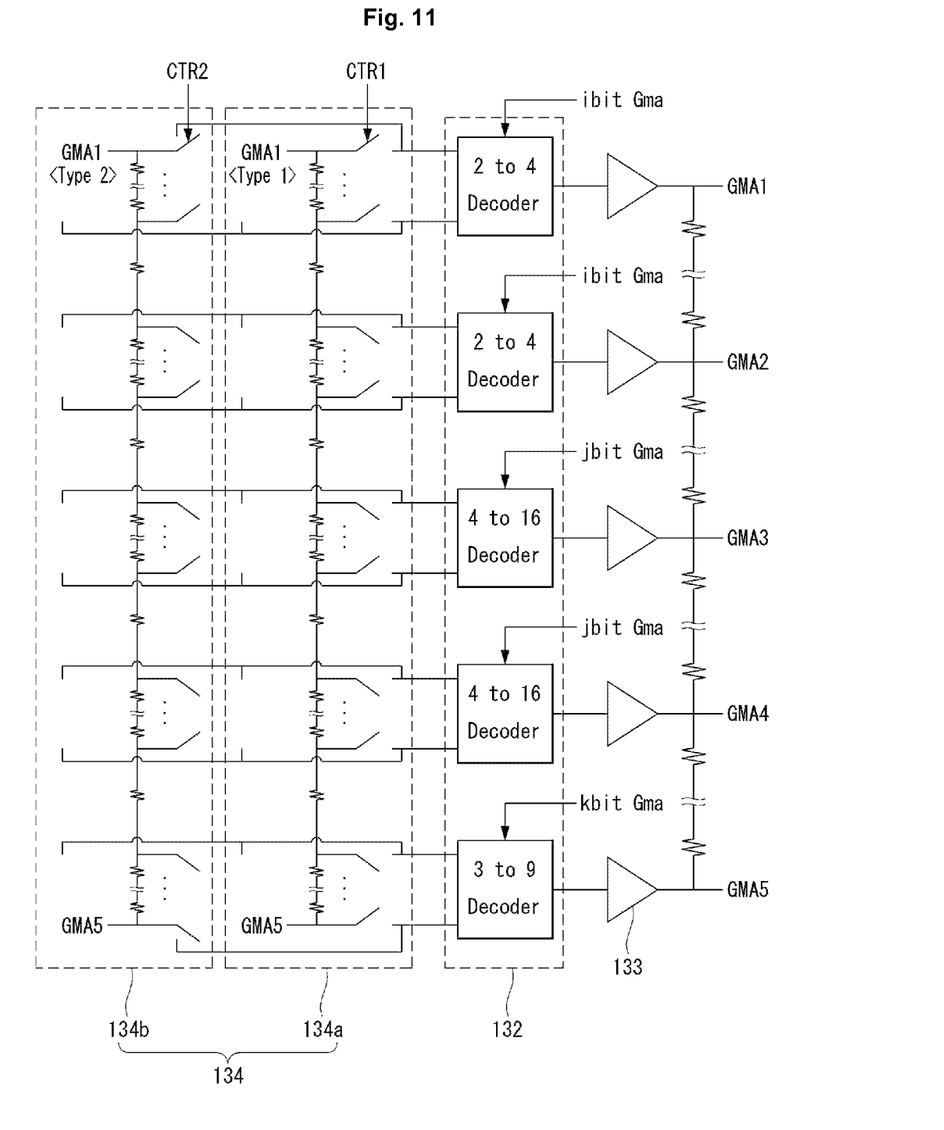
FIG. 11 is a block diagram showing in detail a step voltage regulator shown in FIG. 10.

As shown in FIG. 11, the step voltage regulator 134 may consist of resistors Rs1 to Rsx for dividing voltages according to levels. The resistors Rs1 to Rsx are configured in the form of a resistor string so as to regulate the voltage values of the gamma reference voltages GMA1 to GMA5 output from the decoders 132 in accordance with the characteristics of the display panel. Voltages according to levels generated from the step voltage regulator 134 are respectively supplied to the decoders 132.

N step voltage regulators 134 may have different resistor strings having different resistance characteristics, and output different voltage ratios. The N step voltage regulators 134 may reduce a difference between the step voltages output from the decoders 132 for accurate gamma representation. Alternatively, the N step voltage regulators 134 may increase the difference between the step voltages when there is a need to reduce the number of bits of the decoders 132 due to the problem of resistor costs. To this end, step voltage regulators 134a and 134b capable of reducing the difference between the step voltages and step voltage regulators 134a and 134b capable of increasing the difference between the step voltages may be configured.

Figure 12:
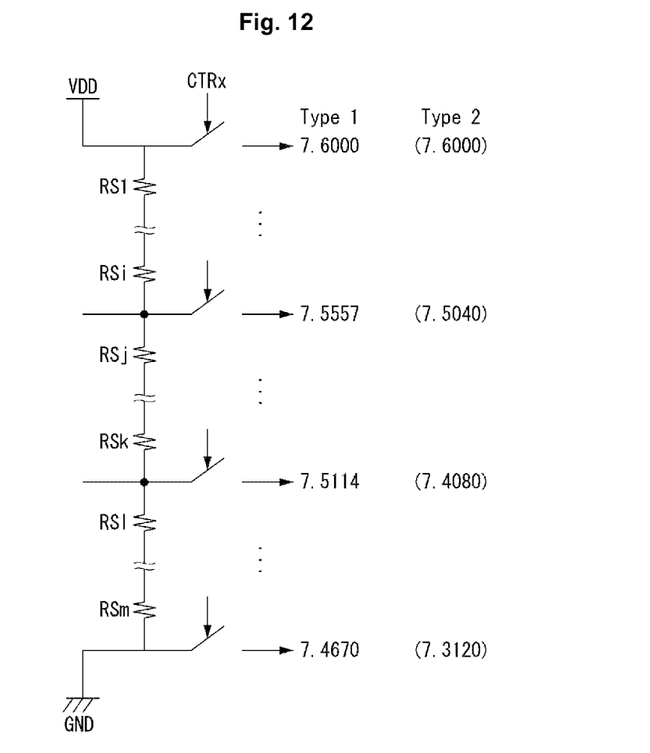
FIG. 12 is a view showing the configuration of part of the step voltage regulator shown in FIG. 11.

FIG. 12 a view showing the configuration of one resistor string of the step voltage regulator 134 for supplying a first gamma reference voltage GMA1 Value to the first decoder 132. The step voltage regulator 134 comprises a plurality of resistors Rs1 to RSx, and a reference voltage (VDD and GND) is supplied to both ends of the step voltage regulator 134. The resistor string divides the voltage applied to both ends by the resistance ratio of the resistors Rs1 to Rsx. Since the first decoder 132 has four voltage steps, it receives four gamma reference voltage values GMA1 Value from the step voltage regulator 134.

Figure 13:
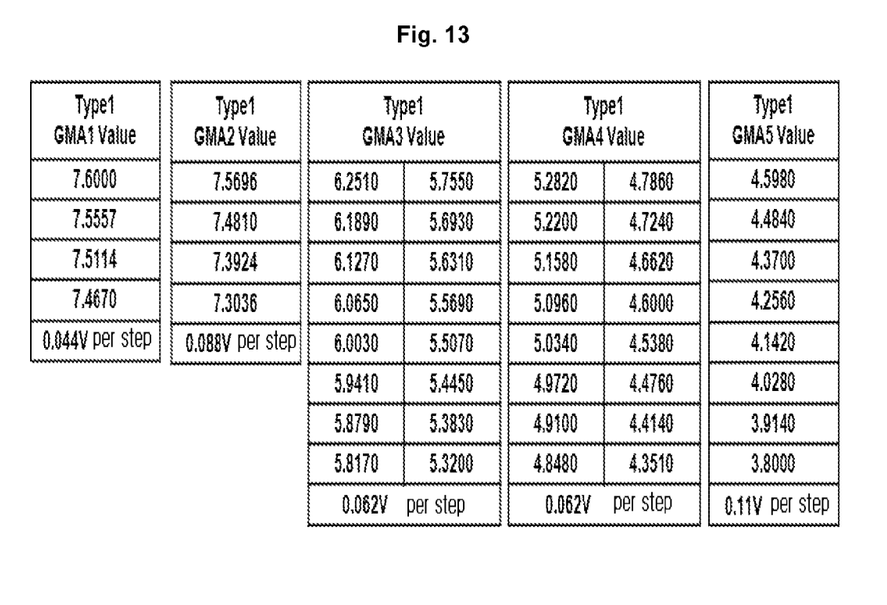
FIGS. 13 and 14 are tables showing gamma reference voltage values obtained by voltage regulation of the step voltage regulator.

As shown in FIGS. 10 to 14, when the first decoder 132a is regulated by the first step voltage regulator 134a, the range of the first gamma reference voltage GMA1 is set to a first gamma reference voltage value Type 1 GMA1 Value of FIG. 13. Assuming that a voltage value regulated by the first step voltage regulator 134a is set to 0.044 V per step, the first gamma reference voltage value Type 1 GMA1 Value is 7.4670, 7.5114, 7.5557, and 7.6000.

Figure 14:
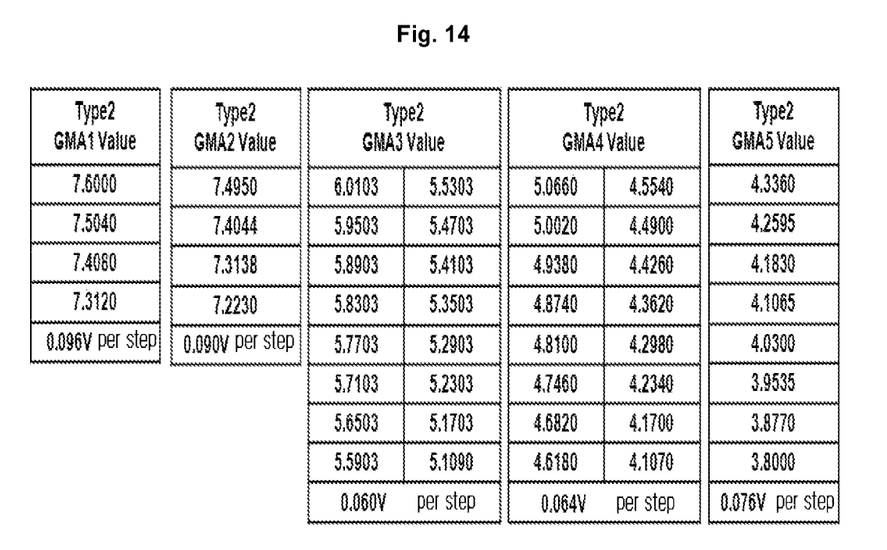

On the contrary, when the first decoder 132a is regulated by the second step voltage regulator 134b, the range of the first gamma reference voltage GMA1 is set to a second gamma reference voltage value Type 2 GMA1 Value of FIG. 14. Assuming that a voltage value regulated by the second step voltage regulator 134b is set to 0.096 V per step, the second gamma reference voltage value Type 2 GMA1 Value is 7.3120, 7.4080, 7.5040, and 7.6000. In the above description, the numeric values represented by the first gamma reference voltage value Type 1 GMA1 Value and the second gamma reference voltage value Type 2 GMA1 Value are only values presented to indicate a voltage change, but not limited thereto.

The step control signal CTR1 or CTR2 may be applied to one selected from the N step voltage regulators 134, but the present invention is not limited thereto. A different step voltage regulator 134 may be selected for each of the decoders 132. In this case, one of the N step voltage regulators 134 may be selected to supply a voltage to each of the decoders 132.

Therefore, the programmable gamma unit according to the second exemplary embodiment of the present invention can regulate the voltage values of the gamma reference voltages GMA1 to GMA5 output from the decoders 132 in accordance with the characteristics of the display panel by means of the step voltage regulator 134.

The configuration of part of the programmable gamma unit according to the present invention has been described with respect to an example in which the number of bits of the decoders occupying an intermediate gray scale is greater than the number of bits of the decoders occupying other gray scales. However, it is needless to say that the present invention is not limited to the above example, and the number of bits allocated to the decoders may be varied so that a desired gray scale area is further divided than other areas. Although, in the present invention, gray scales are divided into low, intermediate, and high, and the number of bits allocated to each of the decoders is 2 bits, 4 bits, and 3 bits, the gray scale division and the bit allocation may be varied depending on the resistors of the decoders. Also, although, in the present invention, the step voltage regulator consists of resistors, it may be an internal memory included in the programmable gamma unit.

As seen from above, the present invention provides a display device comprising a programmable gamma unit capable of finely regulating a gamma voltage level by allocating bits in accordance with gamma characteristics. Moreover, the present invention provides a programmable gamma unit capable of preventing a cost rise since bit allocation (which improves the utilization of limited resources) is carried out to regulate the voltage levels of individual gamma voltage levels in accordance with gamma characteristics. Further, the present invention provides a display device comprising a programmable gamma unit capable of finely regulating a gamma voltage level, without increasing the number of packets, by using a communication protocol. In addition, the present invention provides a display device comprising a programmable gamma unit which can be commercialized regardless of the type of a display panel since a gamma step voltage level can be finely regulated in accordance with the characteristics of a display panel, without increasing the amount of resistors.

What is claimed is:

1. A display device comprising:
    a data driver comprising a digital to analog converter to convert digital data into an analog voltage based on a plurality of gamma reference voltages;
    a display panel to display an image in response to a data signal supplied from the data driver; and
    a programmable gamma unit to supply the plurality of gamma references voltages to the digital to analog converter of the data driver, the programmable gamma unit including decoders and generating the plurality of gamma reference voltages based on outputs of the decoders,
    wherein a different number of bits is allocated to each of the decoders included in the programmable gamma unit.

2. The display device of claim 1, wherein the number of bits allocated to each of the decoders differs according to gray scale.

3. The display device of claim 1, wherein the number of bits allocated to each of the decoders is greater at an intermediate gray scale than at a low gray scale.

4. The display device of claim 1, wherein the number of bits allocated to each of the decoders is greater at the intermediate gray scale at a high gray scale.

5. The display device of claim 1, wherein the number of bits of the decoders is varied in response to bit control signals supplied from an external source.

6. The display device of claim 1, wherein the decoders comprise:
    low gray scale decoders to which i bits (i is an integer equal to or greater than 2) are allocated;
    intermediate gray scale decoders to which j bits (j is an integer equal to or greater than 4) are allocated; and
    a high gray scale decoder to which k bits (k is an integer equal to or greater than 3) are allocated.

7. The display device of claim 6, wherein 2 bits are allocated to the low gray scale decoders, 4 bits are allocated to the intermediate gray scale decoders, and 3 bits are allocated to the high gray scale decoder.

8. The display device of claim 1, wherein the programmable gamma unit comprises a memory that stores a gamma reference voltage supplied from an external source and bit control signal information for defining the number of input and output bits of the decoder.

9. The display device of claim 1, further comprising a step voltage regulator for regulating step voltage level of gamma reference voltages output from the decoders in response to step regulation signals supplied from an external source.

10. The display device of claim 9, wherein the step voltage regulator comprises resistors for dividing voltages according to levels.

11. The display device of claim 9, wherein the step voltage regulator comprises N step voltage regulators to regulate the step voltage level of the gamma reference voltages in accordance with characteristics of the display panel, wherein N is an integer equal to or greater than 1.

12. The display device of claim 10, wherein the step voltage regulator comprises N step voltage regulators to regulate the step voltage level of the gamma reference voltages in accordance with characteristics of the display panel,
    wherein one of the N step voltage regulators is selected to supply a voltage to each of the decoders,
    wherein N is an integer equal to or greater than 2.

13. The display device of claim 1, wherein the programmable gamma unit is included in the data driver.

14. The display device of claim 1, wherein the programmable gamma unit includes:
    output buffers to output the gamma reference voltages based on the outputs of the decoders; and
    a resistor string coupled between outputs of the output buffers.

15. The display device of claim 1, wherein the decoders comprise:
    a first decoder to which a first number of bits are allocated; and
    a second decoder to which a second number of bits are allocated, the second number of bits being different than the first number of bits.

* * * * *